United States Patent [19]

Jimenez

[11] 3,901,137

[45] Aug. 26, 1975

[54] AUTOMATIC ENCHILADA MACHINE

[76] Inventor: James A. Jimenez, 6252 N. Hart, Temple City, Calif. 91780

[22] Filed: July 26, 1974

[21] Appl. No.: 492,066

Related U.S. Application Data

[62] Division of Ser. No. 304,626, Nov. 8, 1972, abandoned.

[52] U.S. Cl. ................... 99/353; 99/427; 99/443 C; 99/450.6; 425/384
[51] Int. Cl.² .. A21C 9/08; A21C 11/00; B29C 3/02
[58] Field of Search ............ 99/353, 352, 355–356, 99/423, 427, 443 C, 450.1, 450.3, 450.6; 100/38, 93 RP; 198/229, 230; 425/335, 363, 337, 384

[56] References Cited
UNITED STATES PATENTS

| 263,634 | 8/1882 | Webster | 198/230 |
|---|---|---|---|
| 2,855,867 | 10/1958 | Zeitlin | 99/450.6 |
| 2,960,045 | 11/1960 | Pentzlin | 99/450.6 X |
| 3,112,713 | 12/1963 | Jahn | 99/450.6 |
| 3,264,974 | 8/1966 | Miller et al. | 99/423 |
| 3,594,863 | 7/1971 | Erb | 425/384 X |

Primary Examiner—Edward L. Roberts
Assistant Examiner—Arthur O. Henderson
Attorney, Agent, or Firm—Whann & McManigal

[57] ABSTRACT

A method and fully automated apparatus for the continuous preparation of specialty foods such as tacos, enchiladas and similar food products of the type characterized by having an outer layer of food material in sheet form which partially encapsulates a filler food material. The apparatus of the invention comprises several associated subsystems which cooperate to form continuous strips of the outer layer sheet material, cook the material in a controlled manner, automatically deposit predetermined amounts of filler material onto the sheet material, accurately fold or form the sheet material about the filler material, and finally cut the article thus formed into segments of a predetermined length for packaging.

6 Claims, 16 Drawing Figures

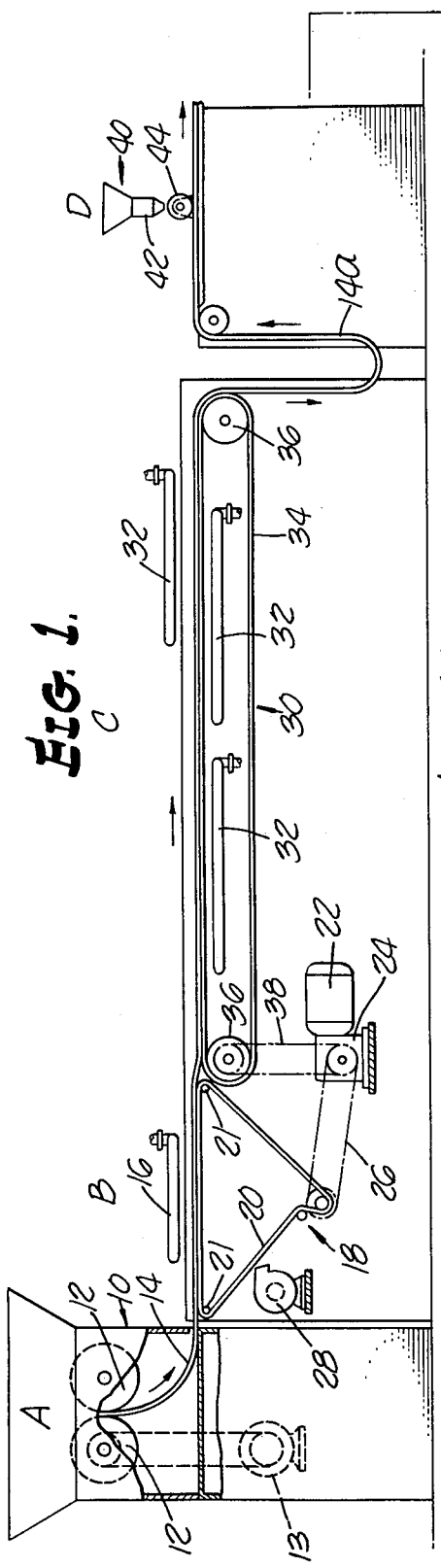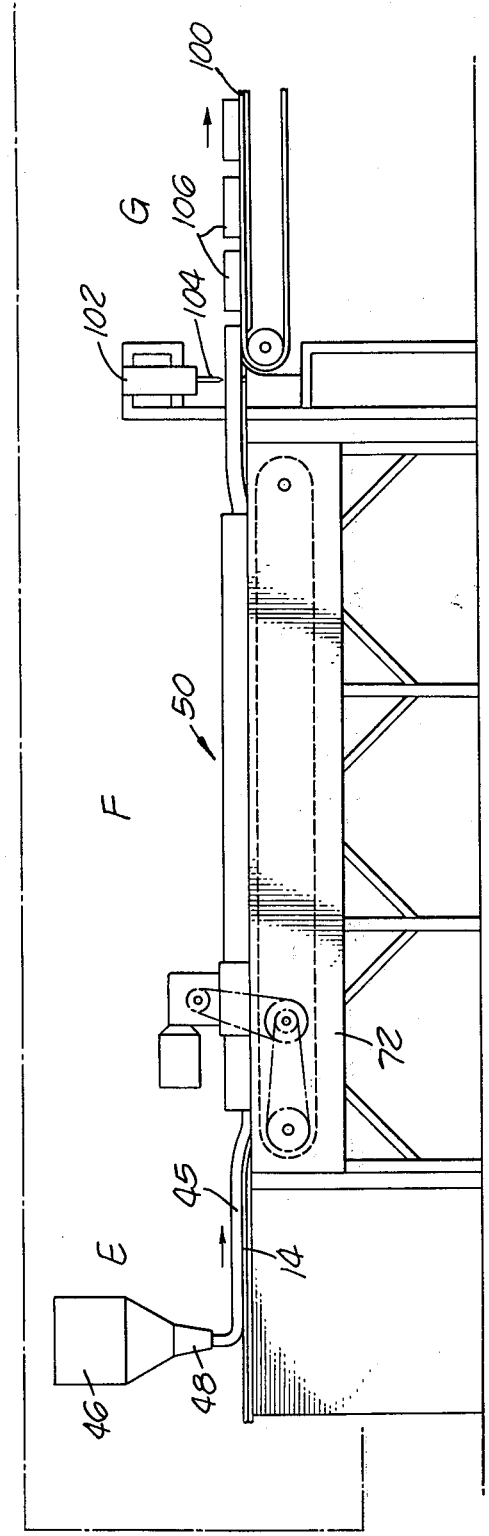

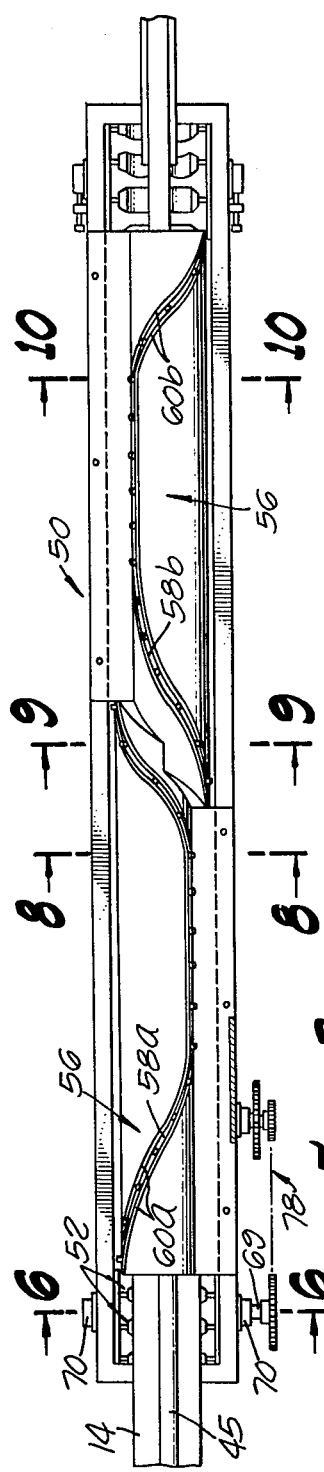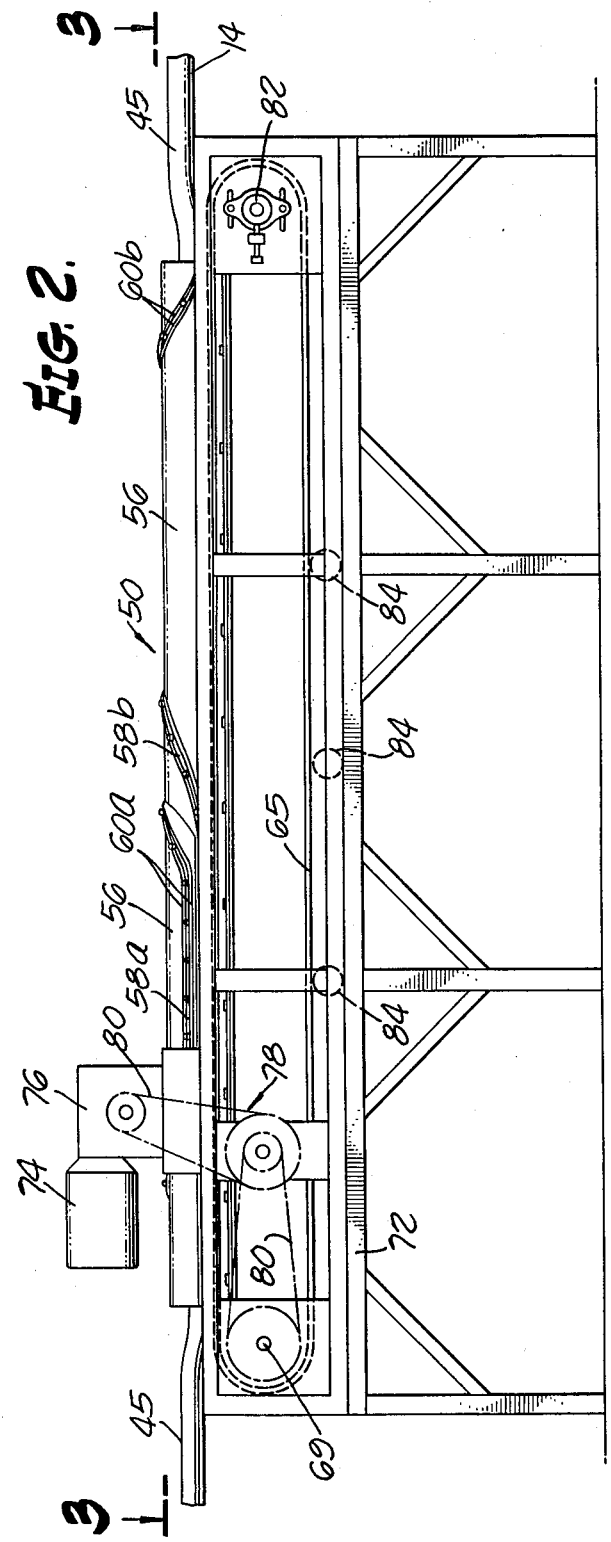

AUTOMATIC ENCHILADA MACHINE

This is a division of application Ser. No. 304,626, filed Nov. 8, 1972, now abandoned.

BACKGROUND OF THE INVENTION

1. Field of the Invention

This invention relates generally to apparatus for the automatic preparation of a food product. More particularly, the invention relates to apparatus for the automatic preparation of Mexican food products such as tacos and enchiladas which are characterized by having an outer layer of a food material in sheet form which encapsulates, or partially encapsulates, a filler food product such as meat, cheese, lettuce and the like.

2. Discussion of the Prior Art

In recent years specialty foods such as Mexican food products have become increasingly popular in the United States. Particularly popular are cooked, or partially cooked, tacos, enchiladas and similar Mexican food products which are offered for sale in frozen food sections of markets and grocery stores for final cooking and preparation at home. These products may be sold as part of complete frozen dinners, or they may be sold individually or in packages containing several tacos or enchiladas. Typically, the products need only to be removed from the package, heated and served.

Both enchiladas and tacos are made by placing a filler food product such as meat, cheese, beans, lettuce, seasonings and combinations thereof onto a thin, substantially flat, planar-shaped article known as a tortilla which typically is made from a corn or wheat flour mixture. The tortilla, which must be very carefully cooked to achieve a desired light, flaky texture, is then folded around the filler product so as to enclose or encapsulate it.

In making the taco, the tortilla is generally folded once upon itself so as to sandwich the filler food product between the two sides of the tortilla. In making the enchilada, on the other hand, one side of the tortilla is first folded around the filler product in one direction and then the other side of the tortilla is folded in the opposite direction back upon itself so that the filler product is rolled up or encapsulated within the tortilla.

In the past tacos, enchiladas and similar products have generally been prepared completely by hand. The hand operation of placing the filler food onto individual tortillas, folding and forming the tortillas, and finally placing the product thus formed into packages is extremely time consuming and is quite costly. As the demand for products of the aforementioned character has increased, there has developed a great need for a fast, fully automatic process for the continuous preparation of high quality tacos, enchiladas and similar food products. The novel apparatus of applicant's invention as described herein have satisfied this demand. Not only have hand filling and forming operations been eliminated, but the novel apparatus of applicant's invention reliably produces end products of superior quality and uniformity over those produced by hand. Further, because applicant's process is continuous and completely automatic, operator handling of the food product and its ingredients is eliminated, thereby enabling superior operational sanitation and cleanliness over hand processes.

SUMMARY OF THE INVENTION

It is an object of my invention to provide a novel apparatus for the high volume, fully automatic preparation of a food product of the type characterized by having a yieldable outer layer of a food material in sheet form which is folded upon itself so as to enclose and contain a filler food material.

More particularly, it is an object of my invention to provide an apparatus of the aforementioned character for the high volume, fully automatic preparation of partially cooked Mexican food products such as enchiladas, tacos and the like.

It is another object of the invention to provide an apparatus for the controlled heating of an uncooked food material in sheet form in a manner as to automatically and uniformly produce a food product of high quality, texture and consistency in which sequentially first one surface of the material is controllably heated while the second or opposite surface is cooled, and then both surfaces are simultaneously heated in a controlled manner.

It is still another object of the invention to provide a highly unique and novel apparatus for automatically and precisely folding a sheet material outer layer around a filler material so as to encapsulate the filler material therewithin. The apparatus is constructed so that after the filler material is deposited on the sheet material, a first portion of the sheet material, which may be in the form of continuous strips or individual planar segments, is automatically folded over the filler material in a direction toward a second portion of the sheet material and subsequently a part of the second portion of the sheet material is folded over the filler in a direction toward the first portion of the sheet material, thereby forming a product of a predetermined cross-sectional configuration in which the filler material is encapsulated within the folded sheet material.

It is still another object of the invention to provide an apparatus of the type described in the preceding paragraphs in which the final food product is prepared in completely sanitary conditions without the necessity of operator handling during the processing cycle.

It is a further object of the invention to provide a novel apparatus for the automatic, continuous processing of Mexican food products which is highly reliable and efficient yet inexpensive to fabricate and maintain.

In summary, these and other objects of the invention are realized by an apparatus for automatically preparing a food product having an outer layer of food material in sheet form which is folded to encapsulate or partially encapsulate a filler food material, said apparatus including cooperating subsystems for sequentially heating the first side of the sheet material while simultaneously cooling the opposite side; simultaneously heating both sides of the sheet material; automatically depositing a predetermined quantity of filler food material on the sheet material; and automatically folding the sheet material around the filler material so as to produce an end product having a predetermined crosssectional configuration.

BRIEF DESCRIPTION OF THE DRAWINGS

FIG. 1 is a generally diagrammatic side elevational view of the apparatus of the invention illustrating the various subsystems which cooperate in accomplishing the process of the invention;

FIG. 1A shows the subsystems involved in the initial steps of the process, i.e, the extrusion, heating and edge treatment of the flexible material used in forming the end product;

FIG. 1B illustrates the subsystems for accomplishing the final steps of the process, i.e., the filling, folding and cutting operations;

FIG. 2 is a side elevational view of the folding subsystem of the apparatus;

FIG. 3 is a plan view of the folding subsystem taken along lines 3—3 of FIG. 2;

DESCRIPTION OF THE PREFERRED EMBODIMENTS

Figure 4:
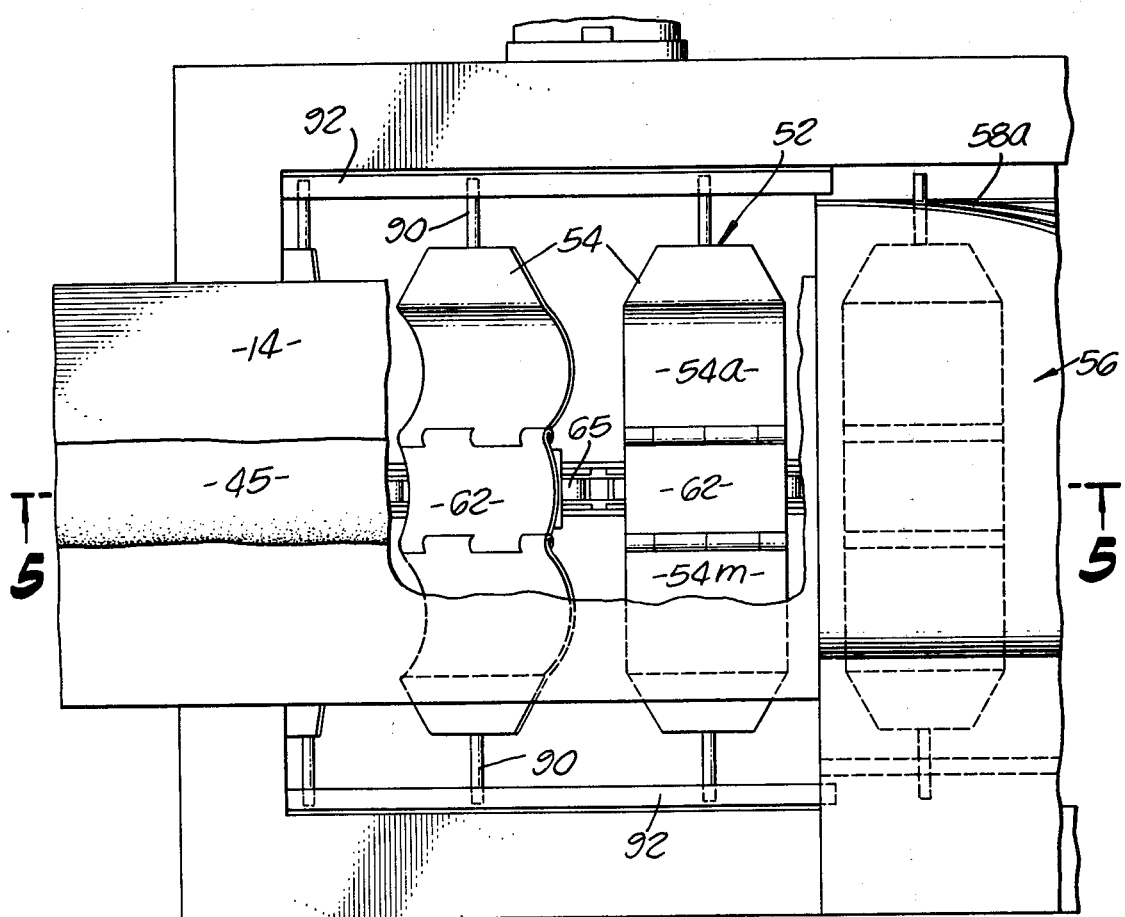
FIG. 4 is an enlarged view of the forward or input end of the folding or forming subsystem, partly broken away to show the configuration of the articulated forming elements and the conveyor means of the subsystem.

Referring to FIGS. 1A and 1B of the drawings, one form of the apparatus of the invention is shown as comprising several operatively associated subassemblies or subsystems which cooperate in the automatic, continuous preparation of a Mexican food product known as an enchilada. The steps of the process are generally identified in the drawings by capital letters and include the dough mixing and extruding or sheeting step A, the initial cooking step B, the secondary cooking step C, the adhesive application step D, the filler food deposition operation E, the folding or forming step F, and the cutting operation G.

At the left of FIG. 1A and identified by the numeral 10, there is diagrammatically illustrated an extruder or sheeting means for receiving a flour dough mixture and for forming the dough into at least one continuous, elongated strip 14 of the food material which in the final product forms the outer layer or covering of the enchilada. The extruder or sheeting means is of a type well known in the art comprising cooperating rollers 12 which form the dough into thin strips or sheets of the desired thickness. One of the rollers 12 may be rotatably driven by a driving means shown here in the form of a variable speed motor 13 interconnected to the driving roller by a suitable drive belt or chain. It is to be noted that the drawings illustrate the formation of a single continuous strip of the outer food material. In actual practice, it is contemplated that multiple strips of material be formed and processed through the apparatus of the invention.

If desired, cutter means (not shown) can be associated with the sheeting apparatus to scallop the edges of the strip material so that the final product will appear to have been made from individual, round tortillas. As will be described hereinafter, these scallops may also serve as locating points for control systems used to synchronize the cutting operation.

The sheet, or tortilla, material is quite fragile and must be cooked under closely controlled temperature conditions in order to produce an outer layer material for the enchilada which is of the desired light, tender and flaky consistency. If the material is improperly heated, it has a tendency to become hard, tough and unpalatable. I have found that to properly cook the strip material 14, it is necessary to first controllably heat the upper surface while keeping the lower surface cool and then to uniformly and controllably, simultaneously heat both the upper and lower surfaces. To accomplish this controlled heating of the material, there is provided means for heating the first side of the sheet material while simultaneously cooling the opposite or second side of the material, shown here as comprising a first heating means 16 and a first conveyor means 18 for moving the material at a controlled rate of speed past the heating means 16. Conveyor means 18 is provided in the form of an endless conveyor belt 20 which is suitably driven around spaced, rotatably mounted rollers 21 by a driving means including a variable speed motor 22, its associated speed reduction mechanism 24 and driving belts or chains 26. A cooling means, shown here as a forced air fan 28, is adapted to blow cool air onto the upper, or supporting surface of conveyor belt 20 so as to cool the conveyor and, in turn, cool the side of the strip material in engagement therewith.

The next subsystem shown in FIG. 1A for simultaneously heating both sides of the strip material 14 comprises a second conveyor means 30 and a second heating means provided in this embodiment as a plurality of heating elements 32 disposed above and below the path of the sheet material as it is carried forwardly through the apparatus. These heating elements, as well as the aforementioned first heating means, may be any type of conventional natural gas or electric, heating elements of a type well known in the art and generally commercially available.

Second conveyor means 30 comprises an endless conveyor belt 34 driven around spaced rollers 36, which are suitably mounted on a supporting frame (not shown) by means of a drive chain or belt 38 operatively connected to gear reduction mechanism 24 of the previously identified driving means. Conveyor belts 20 and 34 may be constructed of various types of material such as plastic, steel or stainless steel, and preferably are of web-like or woven construction.

To properly cook the delicate strip tortilla material, it is important that the first and second heating means be correctly located and suitably regulated to assure uniform heating of the sheet material as it is carried past the heating means at a predetermined rate of speed by the first and second conveyors. By way of example, I have found that during the initial heating of the upper surface of the sheet material, the temperature of the heating elements and the speed of the first conveyor means should be regulated so that the upper surface of the material "puffs" upwardly and forms a thin crust or skin which serves as a moisture barrier. The temperature of the secondary cooking elements should then be regulated to evenly and gently heat both the upper and lower surfaces of the material so as to cook it to a tender, flaky-like consistency.

As best seen in FIG. 1A, the adhesive application and filler deposition subsystem of the invention is spaced apart from the second conveyor means so that the sheet material 14 will be permitted to form a take-up loop generally designated as 14a. This is necessary to accommodate for any material shrinkage or take-up as the material cools, and also to permit the material to be properly aligned for the adhesive application step. In those embodiments of the invention in which multiple strips of material are formed at the sheeting step and simultaneously carried through the processing operations, this take-up loop is very necessary to permit the divergence of the individual strips onto the spaced apart guide means and conveyors of the subsequent or downstream processing subsystems presently to be described.

At the right-hand portion of FIG. 1A and designated by the numeral 40 is a diagrammatic illustration of means for applying adhesive or bonding material to the edges of the sheet material so that when the material is folded over by the folding apparatus, presently to be described, it will remain in the folded configuration until the product can be packaged. Various types of arrangements well known in the art can be used to apply the adhesive. For example, a suitable vegetable or flour adhesive can be dispensed from a dispenser 42 onto rollers 44 which are adapted to engage one or both of the edges of the strip as it moves forwardly of the apparatus so as to deposit the appropriate amount of adhesive onto the strips.

The next step in the process, illustrated at E, is the filler food deposition step wherein the filler food material 45 which, for example, may be meat, cheese, vegetables or combinations thereof, is deposited onto the sheet material. This may conveniently be done by means of a hopper 46 adapted to contain the filler food product and a cooperating nozzle 48 which dispenses the proper amount of filler material onto the sheet material 14 as it is drawn past the nozzle. The filler food, depending upon its consistency, may be pumped from the hopper by suitable pumping equipment, or dispensed as a result of the urging of gravity.

After the filler food material is deposited onto the strip of sheet material, the product moves into the novel and unique folding apparatus or forming means of the invention, generally designated in the drawings by the numeral 50.

Figure 5:
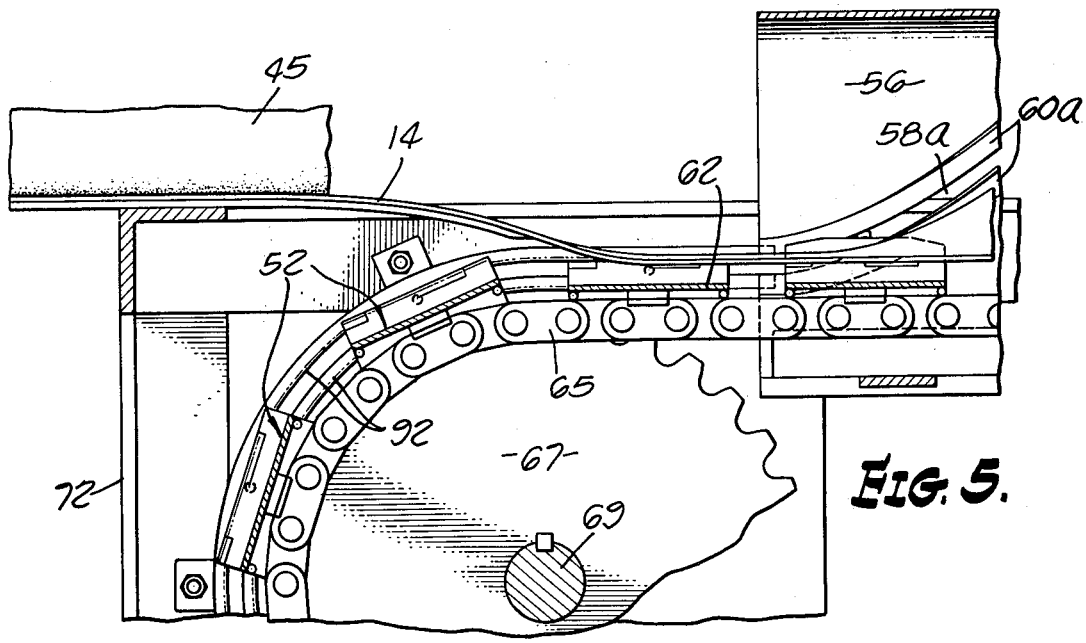
FIG. 5 is a fragmentary side elevational view partly in section taken along lines 5—5 of FIG. 4 further illustrating the configuration of the articulated forming elements and the conveyor means of the folding subsystem of the invention.
Figure 6:
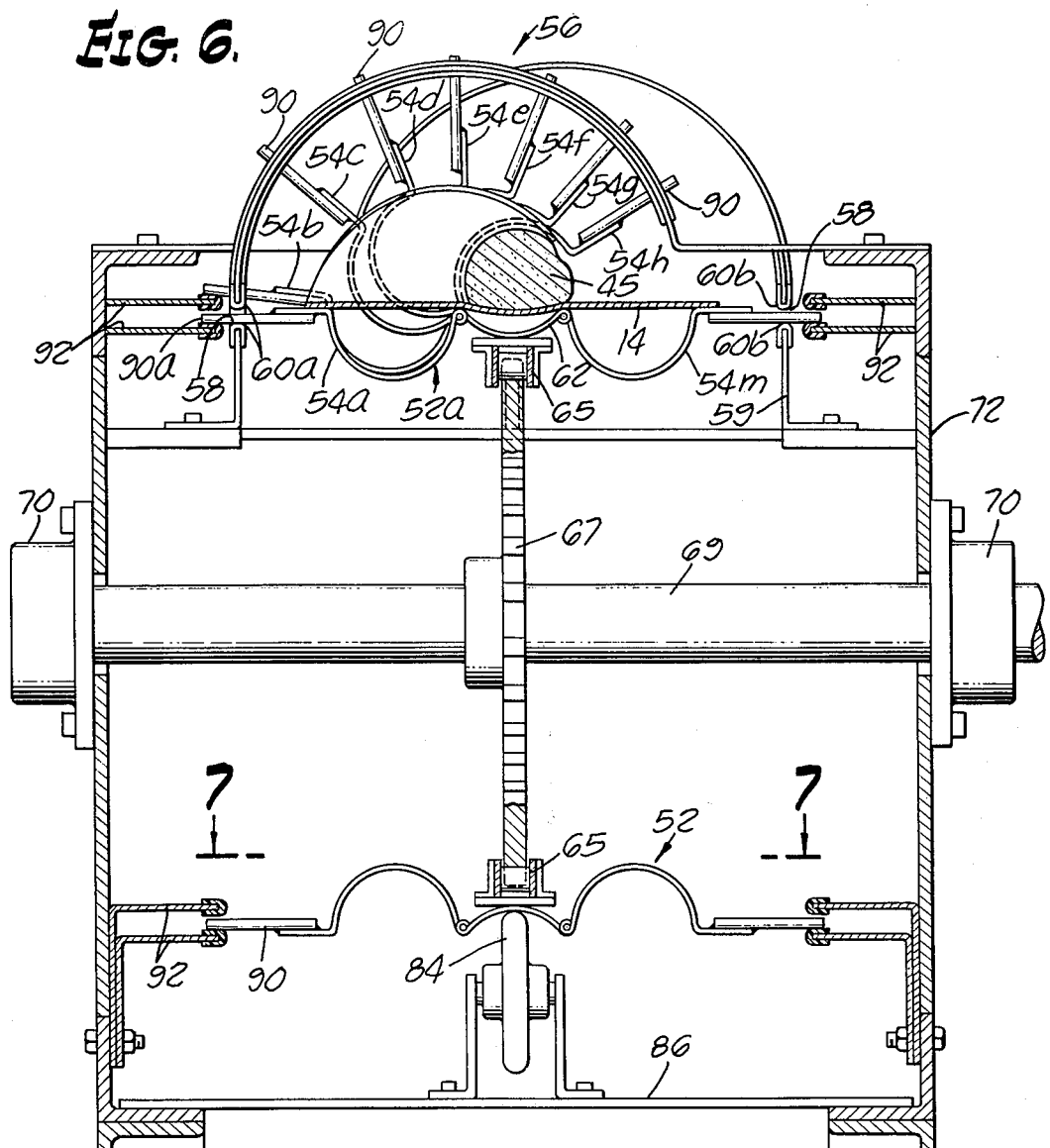
FIG. 6 is a view taken along lines 6—6 of FIG. 3 illustrating the manner in which the wing panels on one side of the forming elements, in cooperation with the guide or cam means of the invention, are moved from a first angular orientation through an angle of predetermined magnitude to a second angular orientation so as to fold a first portion of the sheet material around the filler food material.

Referring particularly to FIGS. 2–6 of the drawings, the highly novel forming means of the invention is shown in this embodiment as comprising sheet material engaging means 52 (FIG. 4) having at least one movable panel, or wing element 54, guide or cam means 56 (FIGS. 2 and 3) through which said sheet material engaging means is moved, and conveyor means for moving the sheet material engaging means through the guide means. As best seen in FIGS. 2 and 6, guide means 56 is provided with passageways or guide channels 58 defined by spaced apart guide elements 60. Guide elements 60 are engageable by a portion of said sheet material engaging means, and as the latter means is moved through the guide means, function to guide the movable panel 54 thereof from a first position through an arc of predetermined magnitude into a second position, thereby forming the sheet material into a predetermined configuration as viewed in cross-section taken transverse to the direction of movement of said sheet material engaging means.

As shown in FIGS. 4 and 6, the sheet material engaging means of this form of the invention comprises a body portion 62 and first and second wing panels, designated as 54a and 54m, which are pivotally connected to the body portion 62. With this construction, as can best be seen in FIGS. 2 and 3, the guide means of the invention is provided with a first passageway 58a defined by spaced apart guide elements 60a operatively engageable by the first wing panels 54a and being so constructed and arranged so that as said forming means is moved through said guide means the first wing panel is moved from a first position through an arc of predetermined magnitude into a second position, and then back to the first position. Guide means 56 also is provided with a second passageway 58b (FIG. 3) defined by spaced apart guide elements 60b operatively engageable by the second wing panels 54m and being so constructed and arranged so that as the sheet material engaging means is moved through the guide means, the second wing panels are moved from a first position through an arc of predetermined magnitude into a second position, and then back to the first position.

The operation of the novel folding subsystem of the invention, which functions to initially fold a first portion of the sheet or tortilla material around the filler food material so as to partially enclose the material and then to fold a second portion of the sheet material around the filler food material and into engagement with the first portion, is best understood by a careful analysis of FIGS. 5, 6, 8, 9 and 10.

Turning first to FIGS. 5 and 6, the body portions 62 of the sheet material engaging means 52 can be seen to be affixed at spaced intervals to links of an endless driving conveyor or chain 65 which comprises a part of the conveyor means of the folding apparatus. Chain 65 is driven in a clockwise direction by a driving sprocket 67 mounted on a shaft 69 which is rotatably carried by suitable bearings 70 mounted near the forward portion of a supporting framework 72. Shaft 69 is driven by a driving means, shown in FIG. 2 as comprising a variable speed motor 74, a gear reduction mechanism 76, and a suitable power train 78 made up of standard rotatably mounted sprockets and drive chains or belts 80.

At the downstream or right-hand portion of frame 72, as viewed in FIG. 2, chain 67 entrained around an idler sprocket (not shown). Means for adjusting the tension of the chain is provided in the form of adjustment mechanism 82 (FIG. 2) operatively associated with the idler sprocket. As best seen in FIG. 6, I also provide roller means 84 for supporting the chain and the articulated elements as they pass beneath the drive and idler sprockets. As shown in FIG. 2, these roller means are supported by transverse members 86 located at spaced intervals along the length of framework 72 and serve to prevent the chain from sagging, and possibly causing damage to it or to the articulated strip material support elements.

Figure 7:
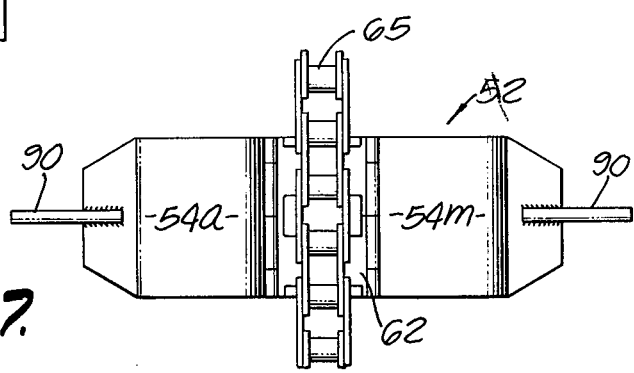
FIG. 7 is a view taken along lines 7—7 of FIG. 6 showing the construction of the articulated elements and the manner in which they are affixed to the conveyor chain.

Before proceeding with a detailed description of the folding operation, it is to be noted that the sheet material supporting means are provided with guide means engaging portions, best seen in FIG. 7 to comprise rod-like elements 90 affixed to and protruding outwardly from the first and second wing panels of the articulated elements. These rod-like elements are adapted to be closely received in the passageways 58a and 58b formed in the guide means and also are adapted to be received between spaced apart guide elements 92 (FIGS. 4 and 6) affixed to framework 72. These latter guide elements are so constructed and arranged as to support the wing panels during that portion of the folding cycle when elements 90 are not supported within passageways 58a and 58b of the guide means.

Referring now to the upper portion of FIG. 6, the articulated element designated as 52a is shown at the position of entry into the guide means with the left hand rod element 90a near the point of entry into passageway 60a of the guide means. At this position, as best seen in FIGS. 4 and 5, the strip material 14 carrying the ribbon of filler material 45 is urged by the folding apparatus conveyor means to move from the deposition station toward the folding subsystem and into supportable engagement with the sheet material engaging means or articulated element 52. As the elements 52 are moved forwardly by conveyor chain 65, the left hand rod elements 90 move into passageways 58a of the guide or cam means 56. As chain 65 continues to move forwardly, the left rod elements 90 will follow the curvature of the passageway 58a causing the wing panel designated in FIG. 6 as 54a to move sequentially into the positions of the wing panels identified as 54b, c, d, e, f, g and h, respectively. This movement of the wing panels, of course, causes the left hand portion of the strip material 14 to be folded around the filler material 45 in the manner illustrated in FIG. 6. It is to be noted that the wing panels 54 are each provided with a curved central portion which functions to form the food material into the desired cross-sectional configuration.

Figure 8:
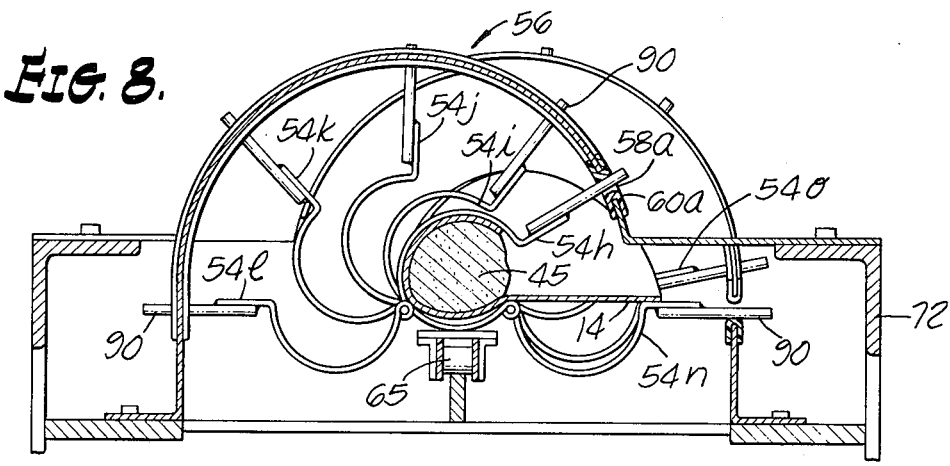
FIG. 8 is a view taken along lines 8—8 of FIG. 3 illustrating the manner in which the wing panels on the first side of the forming elements, after folding a first portion of the sheet material, are moved from the second or folded position back to the original or starting angular orientation.
Figure 9:
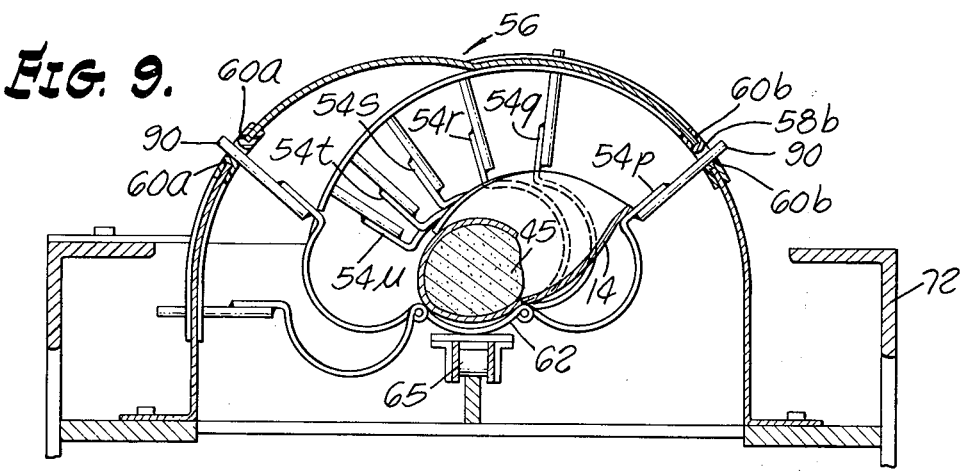
FIG. 9 is a view taken along lines 9—9 of FIG. 3 illustrating the manner in which the wind panels on the second side of the forming elements move from a first angular orientation through an angle of prdetermined magnitude to a second angular position, and in so doing fold a second portion of the sheet material around the filler material and back upon itself so as to encapsulate the filler material within the sheet material and shape it to the desired end product cross-sectional configuration.

Turning now to FIG. 8, it can be seen that the wing panel designated as 54h has moved through its maximum arc. Stated another way, the wing panel has moved from a first position or angular orientation, illustrated by the panel identified as 54a in FIG. 6, through an arc of predetermined magnitude into a second position or angular orientation, illustrated by the panel identified in both FIGS. 6 and 7 as 54h. At this point, continued movement of the conveyor chain 65 will cause the wing panel to move in an opposite angular direction sequentially into the positions of the elements identified in FIG. 8 by the numerals 54i, j, k and l, respectively, until it reaches its first position or initial generally horizontal angular orientation. It is also to be noted that while the left wing panel 54a as viewed in FIG. 6 moves through its predetermined arc in the manner described, the right wing panel 54m travels through the guide or cam means in a generally horizontal orientation until it reaches the position illustrated by the panel designated in FIG. 8 as 54n. At this point, as best seen in FIGS. 2 and 3, the right hand rod elements 90 will enter passageway 58b of the guide means. As seen in FIG. 2, passageway 58b curves upwardly so that as wing panel 54n moves forwardly of the guide means due to the urging of conveyor chain 65, it will be moved into the position of the panel designated as 54o in FIG. 8. Referring to FIG. 9, continued movement of the conveyor chain 65, due to the design of the guide means, will result in movement of the right hand wing panel designated as 54o in FIG. 8 sequentially into the positions of the wing panels identified in FIG. 9 as 54 p, q, r, s, t and u, respectively. This angular movement of the wing panels causes the right hand portion of the strip material 14 to be folded around the filler material and into overlapping engagement with the left hand portion thereof so as to form the configuration illustrated in FIG. 10. When the wing panel reaches the position shown by the wing panel identified as 54u in FIGS. 9 and 10, it has moved through its maximum arc from a first position or angular orientation to a second position or angular orientation, and in so doing has accurately and precisely formed the portion of the sheet material which it supports around the filler material and into the desired cross-sectional configuration.

Figure 10:
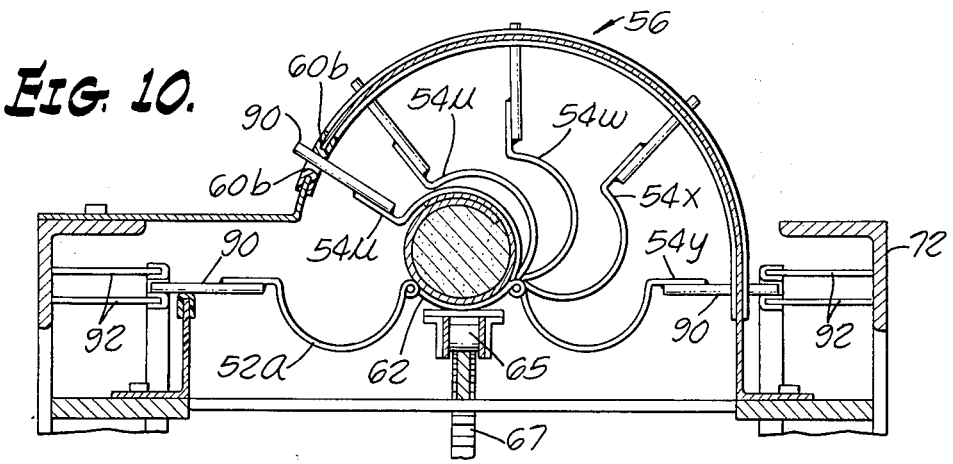
FIG. 10 is a view taken along lines 10—10 of FIG. 3 illustrating the manner in which the wing panels on the second side of the articulated elements are returned to their original generally horizontal angular orientation so that the elements may pass under the cam mechanism and return to their starting position.

With the sheet material formed about the filler material as shown in FIG. 10, the adhesive which was previously deposited on the right-hand edge of the strip material is brought into gripping engagement with the left side of the sheet material and functions to resist any tendency the outer sheet material may have to unroll or return to its original planar configuration.

Due to the configuration of the passageway 58b of the guide means, each right hand wing panel upon reaching the position of the panel identified as 54u in FIG. 10, upon continued forward movement of the conveyor chain 65, will move sequentially into the positions of the panels designated as 54v, w, x and y, respectively. It is to be noted again that while the right hand wing panels move through their predetermined arc as described, the left hand panels move through the guide or cam means in a generally horizontal orientation. As best seen in FIG. 6, to provide support to both the right and left hand panels of the articulated elements during the time they are within the guide means but are not guidably supported by passageway 58a and 58b, I provide angle brackets 59 which are affixed to and extend longitudinally of frame 72.

With the articulated elements in the position of the element identified by the numeral 52a in FIG. 10, the rod elements 90 affixed thereto are in a position to engage the spaced apart guide elements 92 which provide support to the wing panels as the chain moves around the idler sprocket and beneath the guide means toward the drive sprocket.

By way of brief summary of the folding operation, as the continuous length of strip material 14 carrying the filler material 45 is drawn through the folding apparatus or forming means of the invention, the articulated elements 54 in cooperation with the guide means 56, in the manner illustrated in FIGS. 6–10 and as previously described, will first cause one side of the sheet material to be formed around the filler food material as shown in FIG. 8, and then will cause the opposite side of the sheet material to be folded around the filler material and back upon itself as shown in FIG. 10 so as to encapsulate the filler material within the sheet material.

It is to be appreciated that although in the embodiment of the invention shown in the drawings the folding apparatus is arranged to receive and form sheet material in a continuous strip, the folding apparatus as a separate unit is equally well suited for folding sheet material in the form of individual tortillas or similar planar members upon which a filler material has been deposited.

Referring again to FIG. 1B, the cutting step G of the method of the invention is performed by a cutting subassembly which includes a conveyor 100 adapted to receive the folded product from the folding apparatus and a cutting means shown here as comprising an automatic cutting mechanism 102 having a cutting blade 104 for cutting the folded product into segments of a predetermined length. The cutting mechanism, which forms no part of the invention, is preferably electrically operated and of a type well known in the art which can be operatively coupled with control mechanisms for controlling the activation of the unit in response to a signal received from a remote sensor. By way of example, as previously mentioned, when the strip material 14 is cut so as to form scalloped or shaped edges, these edges may be used to activate either a mechanical or photoelectric sensor (not shown) located upstream or in advance of the folding apparatus. This type of sensor can be adapted to read the indentations in the sheet material as formed by the scallops and appropriately activate the cutting means so as to cause it to cut the folded product at the proper locations.

After the folded product is cut in the manner described so as to form the finished enchilada designated in FIG. 1B by the numerals 106, each enchilada is carried by conveyor 100 to a packaging station where the enchiladas are suitably packaged for shipment.

In FIGS. 11–14 there is illustrated another form of the invention particularly suited for the automatic preparation of a Mexican food product known as a taco. Tacos, which are generally made by hand, consist of an outer shell or covering of sheet material known as a tortilla which is folded around a filler food material such as meat, beans, or the like.

Figure 11:
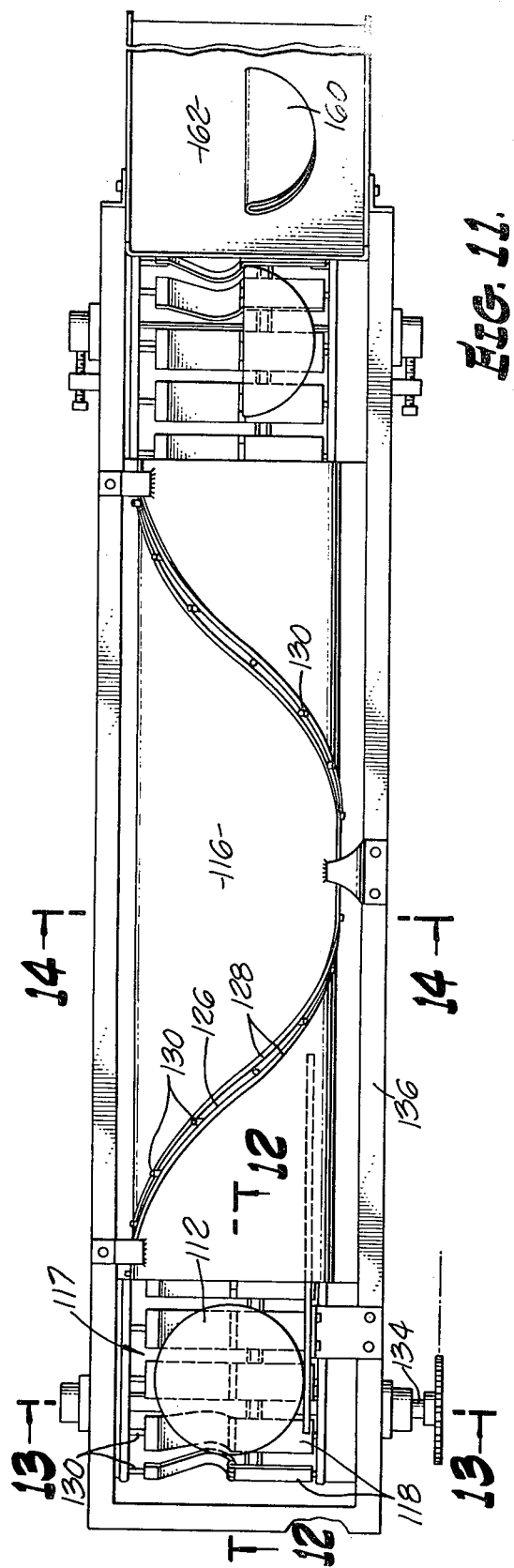
FIG. 11 is a plan view of another form of the folding apparatus of the invention for preparing a Mexican food product known as a taco.
Figure 12:
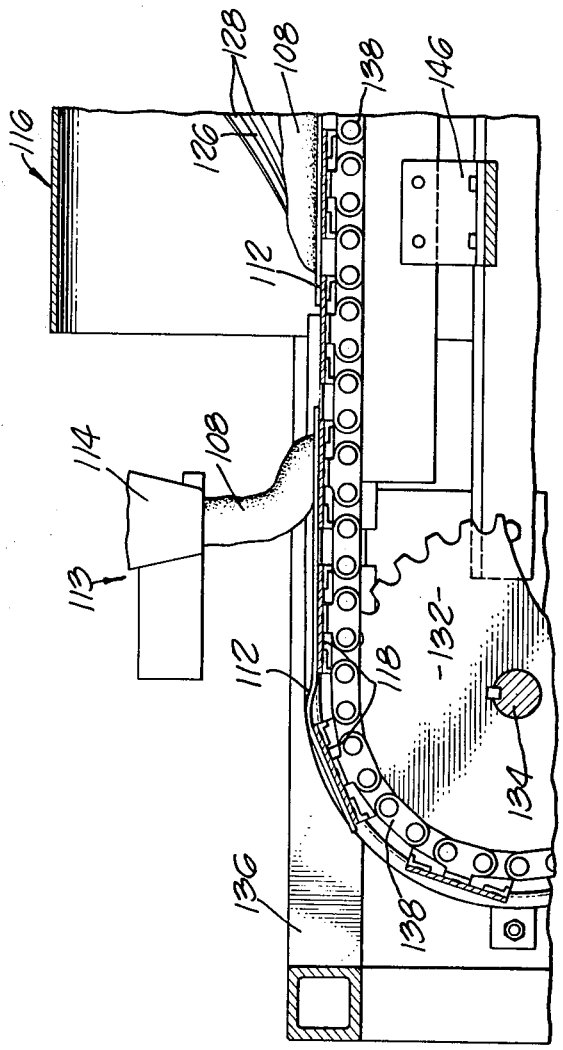
FIG. 12 is an enlarged view taken along line 12—12 of FIG. 11 illustrating the construction of the conveyor means and the articulated folding elements, and also showing the manner in which the filler food material is deposited on the sheet material shown here as a tortilla.

Referring particularly to FIGS. 11 and 12, this embodiment of the invention can be seen to comprise means for depositing the filler food material 108 onto one surface of the sheet material, the sheet material being shown here in the form of a circular generally flat tortilla 112, and forming means for folding a first portion of the sheet material around the filler food material in a direction toward a second portion of the sheet material so as to sandwich the filler food material between the first and second portions of the sheet material or tortilla.

The filler food deposition means, generally identified in FIG. 12 by by the 113, is of a construction similar to the deposition means previously described herein having a hopper (not shown) for containing the filler material and a nozzle 114 for dispensing a predetermined amount of filler material onto the sheet material or tortilla 112.

Figure 13:
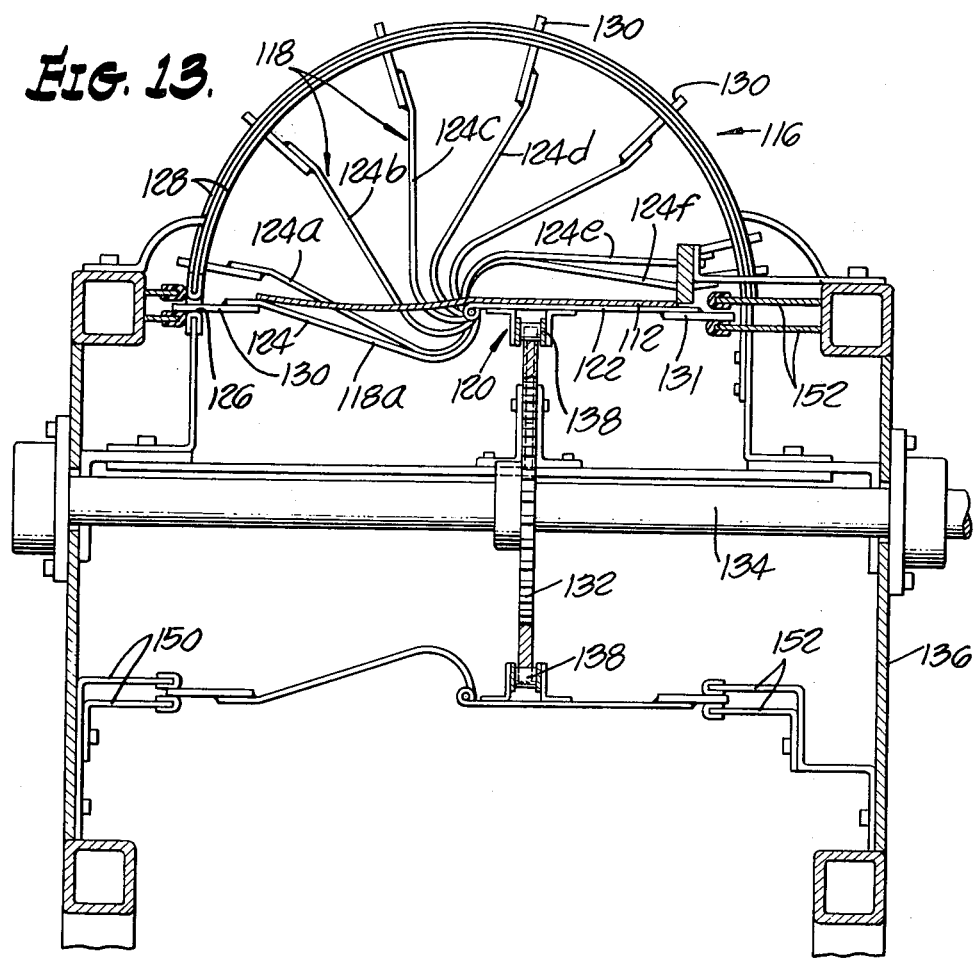
FIG. 13 is a view taken along lines 13—13 of FIG. 11 illustrating the manner of movement of the movable wing panel of the folding element of this form of the invention during the operation of folding the tortilla around the filler material.

The forming means in this embodiment of the invention comprises a sheet material, or tortilla; engaging means for supporting the tortilla during the forming operation; guide or cam means 116 through which said tortilla engaging means is moved; and conveyor means 117 for moving the tortilla engaging means through the guide means. The tortilla engaging means, as best seen in FIG. 13, comprises a plurality of articulated folding elements 118 each having a body portion 120, a first wing panel 122, and a second wing panel 124 pivotally movable relative to the first wing panel for forming the sheet material around the filler material.

Cam means 116 (FIG. 11) is provided with a passageway 126 defined by spaced apart guide elements 128 which are operatively engageable by rod-like elements 130 affixed to the movable wing panels 124 of the tortilla engaging means. The cam means 116 is constructed so that as the tortilla engaging means, or elements 118, are moved at a uniform rate of speed through the guide means by the conveyor means 117, the movable wing panels 124 thereof are moved from a first angular orientation through an arc of predetermined magnitude into a second angular orientation and then back to the starting orientation. In this way the tortillas which are supported by the tortilla engaging means, as shown in FIG. 14, are formed into a predetermined configuration as viewed in cross-section to the direction of movement of the tortilla or sheet material engaging means.

Turning to FIGS. 11 and 12, the conveyor means of this form of the invention can be seen to be of similar construction to the conveyor means of the folding apparatus of the previously described embodiment and, therefore, will not be described in great detail. Briefly, the conveyor means of this embodiment comprises a driving sprocket 132 mounted on a shaft 134 rotatably carried by a frame 136 of the apparatus; an idling sprocket (not shown); an endless conveyor chain 138 reeved around the sprockets; and means for driving the conveyor such as an electric motor (not shown) operatively coupled to the driving sprocket. As best seen in FIG. 14, means for supporting the chain it as its passes through the cam means 116 is provided in the form of support brackets 146 affixed to transversely extending supporting members 148.

During the portion of the folding cycle when the rod elements 130 of the movable panels 124 are not supported by the guide channel or passageway 126 of the cam means, the panels are supported by spaced apart guide elements 150 (FIG. 13) affixed to frame 136 and adapted to guidably receive rod elements 130. To support panels 122 of the articulated support elements as they move through the forming operation, there is provided similarly constructed spaced apart guide elements 152 which are affixed to the opposite side of frame 136. As shown in FIG. 13, guide elements 152 are adapted to guidably support rod elements 131 which are affixed to the outer extremities of panels 122 of the articulated elements.

Figure 14:
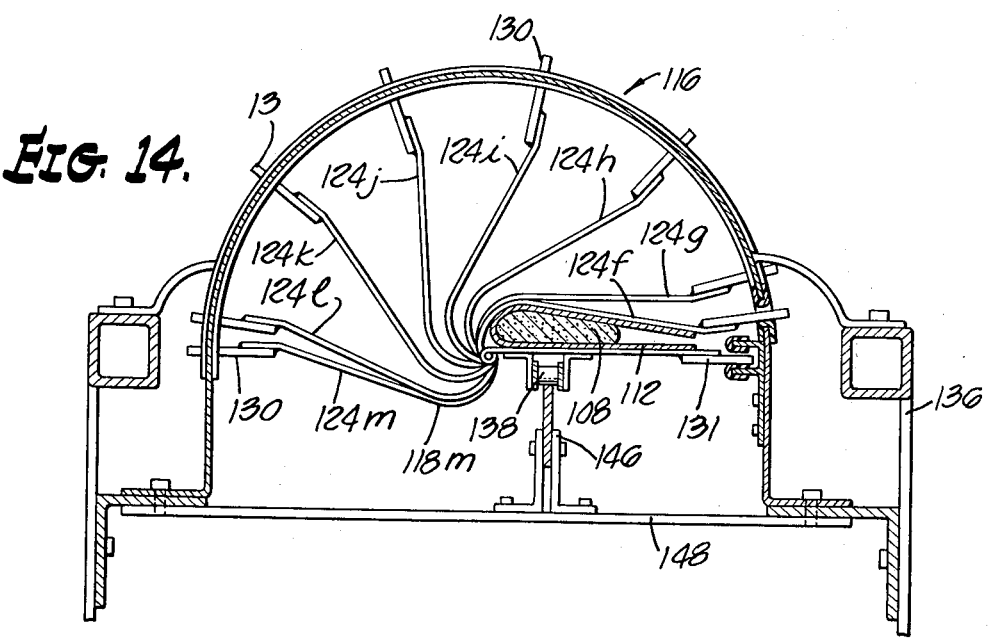
FIG. 14 is a view taken along lines 14—14 of FIG. 11 illustrating the way in which the movable panel, after folding the tortilla, is returned to its starting angular configuration.

The operation of the novel folding apparatus of this form of the invention can best be understood by a careful analysis of FIGS. 13 and 14. As shown in these figures, the body portions 120 of the tortilla engaging means are affixed at spaced intervals to links of the conveyor chain 138 so that as the chain is driven forwardly of the apparatus by drive sprocket 132, the tortilla engaging means will enter and move through the cam means, then pass longitudinally of the apparatus below the cam means, and finally once again re-enter the cam means at the forward end of the apparatus.

At a location upstream of the cam means of the apparatus, a tortilla is placed upon the tortilla engaging means and, as shown in FIG. 12, a predetermined amount of filler material is deposited onto the tortilla. As the tortilla and filler material are carried forwardly by the conveyor means, the articulated folding elements supporting the tortilla will move to the position illustrated by the element designated in FIG. 13 as 118a. Continued forward movement of the conveyor will cause the rod-like elements 130 affixed to the movable panels of the folding elements to enter passageway 126 formed in cam means 116. Guided by curved passageway 126 the rod-like elements 130 will cause the folding panels 124 of the folding elements 118 to move sequentially into the positions of the wing panels identified in FIG. 13 by the numerals 124 a, b, c, d, e, f and g, respectively. This movement of the wing panels, of course, causes the tortilla to be folded around the filler material into the configuration shown in FIG. 14. It is to be noted that the movable wing panels of this form of the invention are curved appropriately so as to shape the tortilla into the desired cross-sectional configuration.

Turning now to FIG. 14, it is to be observed that the wing panel designated as 124f has moved through its maximum arc. Stated another way, the wing panel has moved from a first position or angular orientation, illustrated by the panel identified as 124 in FIG. 13, through an arc of predetermined magnitude into a second position or angular orientation, illustrated by the panel identified in both FIGS. 13 and 14 as 124f. At this point, continued movement of the conveyor chain 138 will cause the wing panel to move in an opposite angular direction sequentially into the positions of the elements identified in FIG. 14 by the numerals 124g, h, i, j, k, l and m, respectively, until it reaches its first position or initial generally horizontal angular orientation. It is also to be noted that while the left wing panel 124 as viewed in FIG. 13 moves through its predetermined arc in the manner described, the right wing panel 122 travels through the guide or cam means in a generally horizontal orientation.

With the articulated folding element in the position of the element identified in FIG. 14 by the numeral 118m, the rod elements 130 and 131 will enter guide elements 150 and 152 which provide support to the wing panels as the chain 138 moves around the idler sprocket and beneath the guide means toward the drive sprocket.

It is to be appreciated that although in the form of the invention shown in FIGS. 11-14 the folding apparatus is arranged to receive sheet material in the form of individual tortillas, the unit could also be used to fold sheet material in continuous strip form as was the case in the embodiment of the invention previously described.

As is best seen in FIG. 11, after the product has been shaped into the configuration shown in FIG. 14 so as to form the finished taco 160, the tacos are transferred from the conveyor means of the folding apparatus onto either a packaging conveyor or packaging table 162. The individual tacos can then be packaged as part of a frozen dinner or the like, or they can be packaged in separate packages containing one or more individual tacos.

I claim:

1. An apparatus for automatically preparing a food product having a cooked or partially cooked outer layer of food material in sheet form which is folded so as to encapsulate a filler food material, comprising:
    a. means for heating the first side of the sheet material while simultaneously cooling the opposite or second side of the sheet material, said means including a first heating means;
    b. a second heating means for simultaneously heating both the first and second sides of the sheet material;
    c. deposition means for depositing a filler food material on the sheet material; and
    d. forming means for folding a first portion of the sheet material around the filler food material so as to partially enclose the filler material.

2. An apparatus as defined in claim 1 including means for folding a second portion of the sheet material around the filler food material and into engagement with the first portion of the sheet material so as to encapsulate the filler food material within the sheet material.

3. An apparatus as defined in claim 1 including sheeting means for forming the sheet material into at least one continuous strip, and further including:
    a. a first conveyor means for moving the strip of sheet material from said extruder past said first heating means; and
    b. a second conveyor means for moving the strip of sheet material from said first conveyor means past said second heating means.

4. An apparatus as defined in claim 3 in which said means for heating the first side of the sheet material while cooling the opposite side thereof includes a cooling means for cooling said first conveyor means.

5. An apparatus as defined in claim 3 including means for applying an adhesive material to at least one edge portion of the strip material.

6. An apparatus as defined in claim 3 including cutting meeans for automatically cutting the strip material into segments of a predetermined length after it has been folded so as to enclose the filler food material.

* * * * *